Feb. 18, 1964  A. E. KRUEGER ETAL  3,121,585
LOCKING MECHANISM FOR FOLDING SEATS
Filed Aug. 11, 1960  4 Sheets-Sheet 1
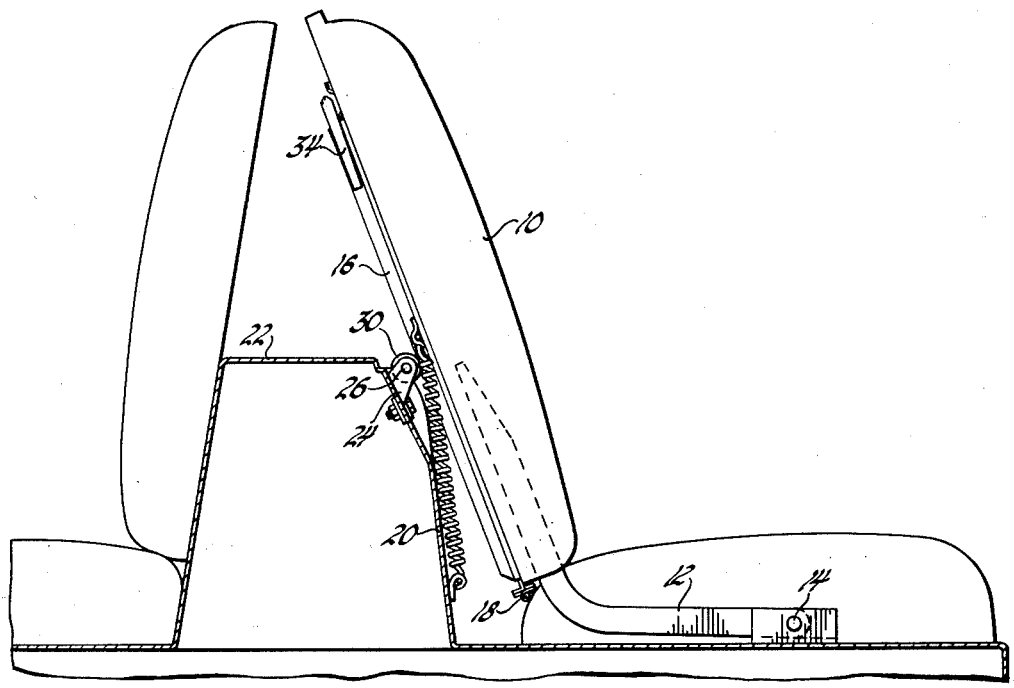
Fig. 1
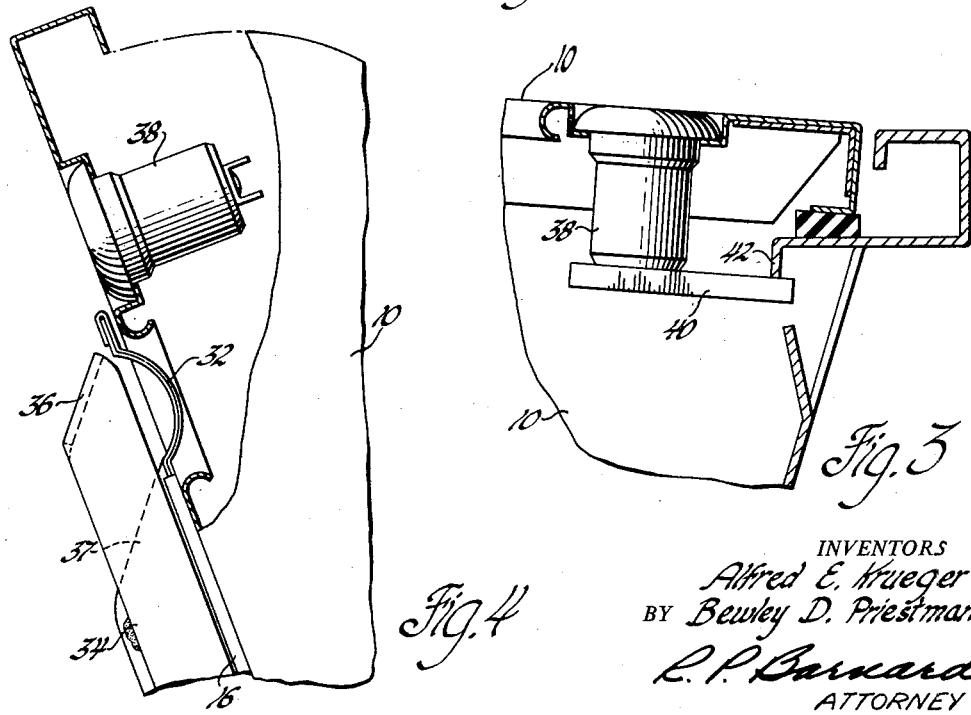
Fig. 4
Fig. 3
INVENTORS
Alfred E. Krueger &
BY Bewley D. Priestman
C. P. Barnard
ATTORNEY

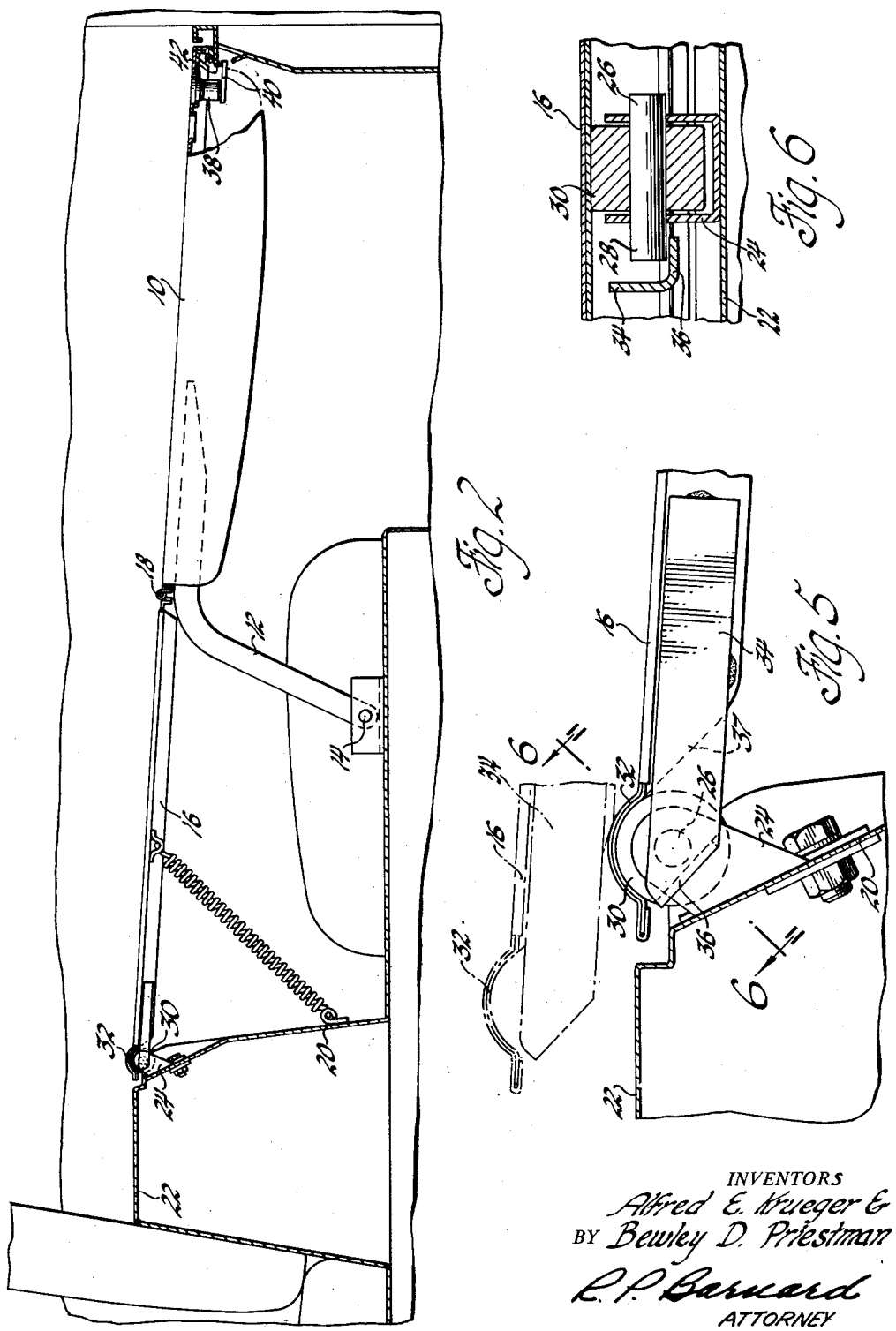

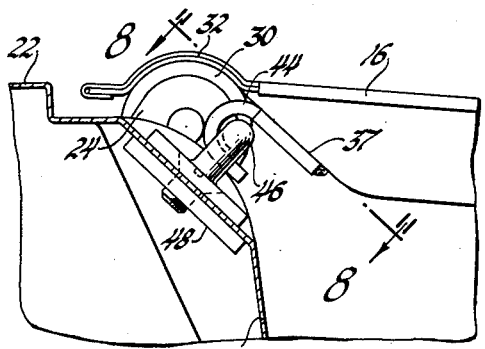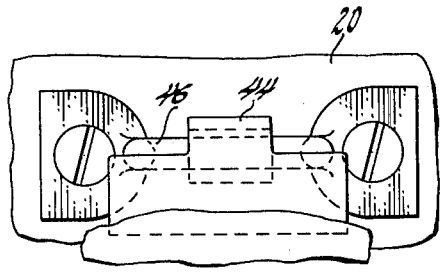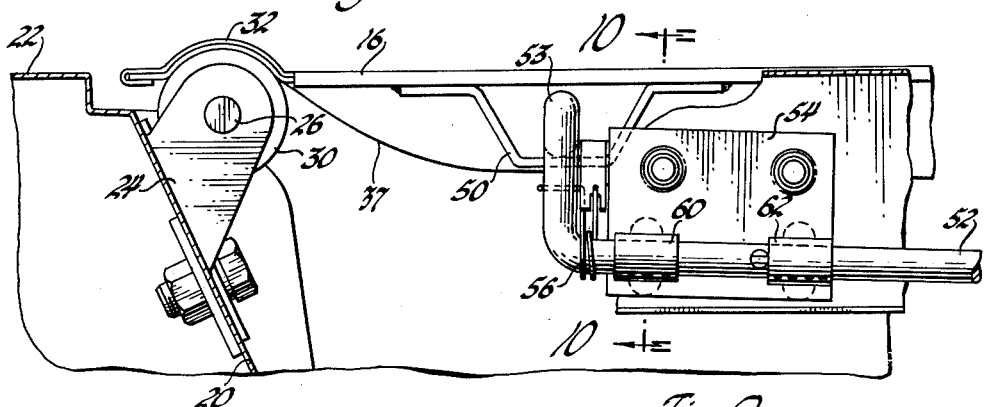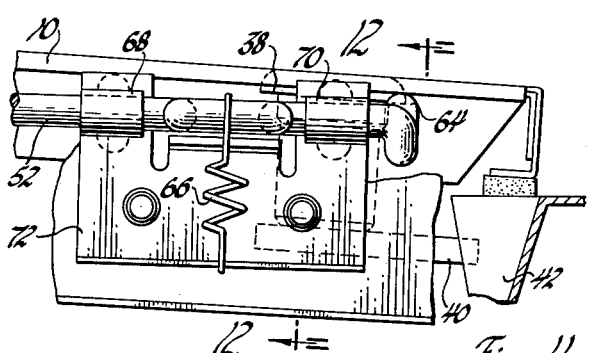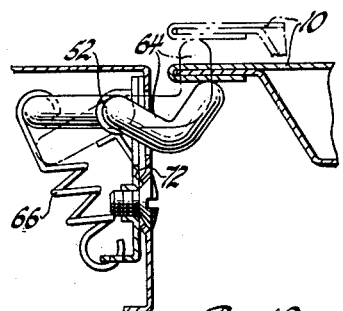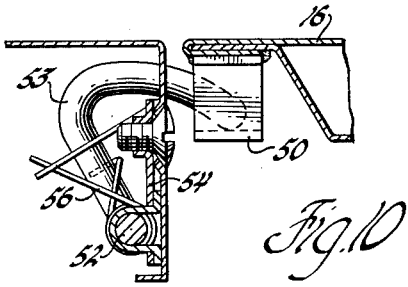

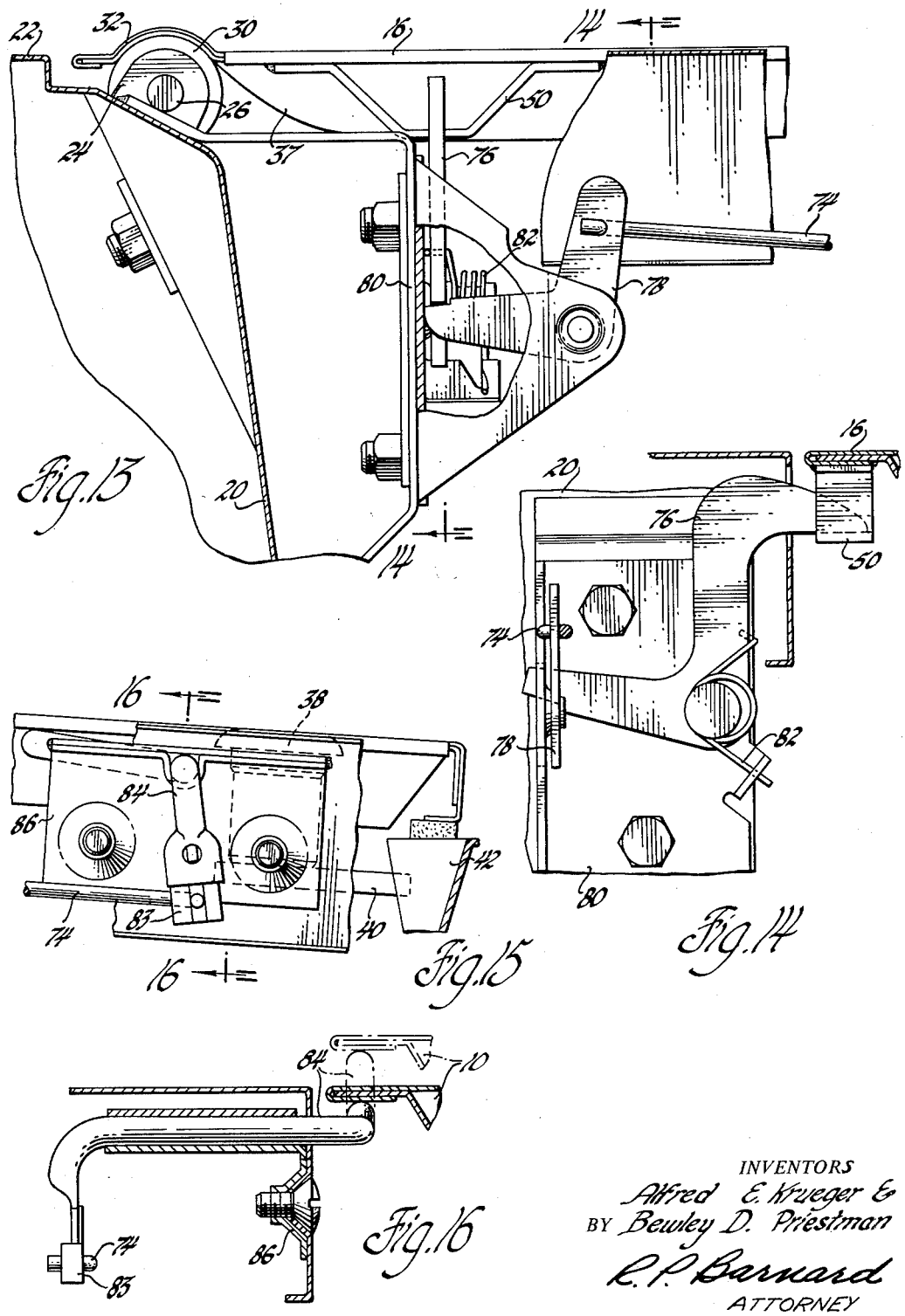

United States Patent Office 3,121,585
Patented Feb. 18, 1964

3,121,585
LOCKING MECHANISM FOR FOLDING SEATS
Alfred E. Krueger, Detroit, and Bewley D. Priestman, Grosse Pointe, Mich., assignors to General Motors Corporation, Detroit, Mich., a corporation of Delaware
Filed Aug. 11, 1960, Ser. No. 48,924
7 Claims. (Cl. 296—66)

This invention relates to vehicle seats and, more particularly, to locking mechanism associated with a folding vehicle seat.

Automobiles having station wagon bodies are commonly provided with folding seats that provide an auxiliary floor for transportation of various articles. When the seats are in a folded position which provides the auxiliary floor, we have found it desirable to provide latching mechanism to maintain the seat in the folded floor-forming position.

Accordingly, an object of this invention is to provide improved latching mechanism for holding a folding seat in an auxiliary floor-forming position. Another object of this invention is to provide latching mechanism for a folding seat structure comprising a pivoted seat back which may be pivoted downwardly to a position in which the rear of the seat back provides an extension of the deck or floor of an automobile luggage compartment. A further object of this invention is to provide latching means associated with an auxiliary floor-forming plate associated with the seat back and latch control mechanism operable in response to downward floor-forming positioning of the seat back. Still a further object of this invention is to provide locking means associated with the folding seat to prevent unauthorized access to the area beneath the auxiliary floor.

Other objects and advantages of this invention will be comprehended from the following detailed description and the accompanying drawings, wherein:

FIGURE 1 is a side elevational view of a foldable vehicle seat in an upright or seat forming position;

FIGURE 2 is a side elevational view of a foldable vehicle seat, embodying the present invention, in a folded or floor-forming position;

FIGURE 3 is an enlarged detail view of a portion of the latching mechanism associated with the foldable vehicle seat shown in FIGURE 2;

FIGURE 4 is an enlarged detail view of another portion of the latching mechanism on the seat forming position;

FIGURE 5 is an enlarged detail view of the latching apparatus shown in FIGURE 4 in the folded position;

FIGURE 6 is a sectional view taken along the line 6—6 in FIGURE 5;

FIGURE 7 is a detail view of alternative latching mechanism useable with the apparatus shown in FIGURE 2;

FIGURE 8 is a sectional view taken along the line 8—8 in FIGURE 7;

FIGURE 9 is a partial elevational view of a portion of another alternative embodiment of the invention;

FIGURE 10 is a sectional view taken along the line 10—10 in FIGURE 9;

FIGURE 11 is a partial elevational view of another portion of the embodiment of FIGURE 9;

FIGURE 12 is a sectional view taken along the line 12—12 in FIGURE 11;

FIGURE 13 is a partial elevational view of another alternative embodiment of the invention;

FIGURE 14 is a sectional view taken along the line 14—14 in FIGURE 13;

FIGURE 15 is a side elevational view of another portion of the embodiment shown in FIGURE 13; and FIGURE 16 is a sectional view taken along the line 16—16 in FIGURE 15.

Referring now to the drawings, a seat back 10 is pivotally supported on a hinge 12 about the pivotal connection 14 and is movable from the upright seat-forming position shown in FIGURE 1 to the folded auxiliary floor-forming position shown in FIGURE 2. An auxiliary floor-forming panel 16 is pivotally connected to the lower edge of the seat back by a hinge 18. In the illustrative embodiment, the seat described is the rearwardly facing third seat of the current station wagon designs. An upwardly extending portion of the vehicle floor panel 20 is provided in the space adjacent the seat back 10 in the upright position and includes an auxiliary floor-forming top surface 22. A support bracket 24 is fixed to the panel portion 20 and supports a pin member 26 having one end extended to provide a striker 28 as shown in FIGURE 6. It is to be understood that a similar pin member and the hereinafter described associated latching mechanism may be provided on both sides of the seat. A roller member 30 is rotatably supported on the pin member 26 and is engageable with an outwardly curved portion 32 of the auxiliary floor-forming panel 16 in the floor-forming position. As the seat back 10 is moved between the upright position and the floor-forming position, the underside of the auxiliary floor-forming panel 16 slidingly engages the roller member 30 as the auxiliary panel rotates on the hinge 18 relative to the seat back between an upright position closely substantially parallelly adjacent the seat back and an auxiliary floor-forming position. As shown in FIGURES 4 and 5, a hook plate 34 is suitably secured to the underside of the auxiliary floor-forming panel 16 and has a hook extension 36 positioned outwardly away from and parallel to a guide surface 37 that is contiguous with the curved portion 32 so that the hook extension will be positioned behind the striker portion 28 of the pin member 26 as the auxiliary floor-forming panel 16 slides downwardly on the roller members 30 to the floor-forming position. Referring now to FIGURES 3 and 4, the upper end of the seat back 10 is provided with a conventional key cylinder 38 which is operatively associated with a locking plate 40 adapted to lockingly engage a striker flange 42 provided on the vehicle body adjacent auxiliary floor-forming position of the upper end of the seat back.

An alternative latching construction is illustrated in FIGURES 7 and 8 and comprises a U-shaped hook member 44 that is suitably secured to the outwardly curved surface 37 of the auxiliary floor-forming panel 16 and adapted for engagement with a striker bar 46 secured to the floor panel portion 20 by a tapping plate 48 or other suitable device.

Referring now to FIGURES 9 and 10, a modification providing latch actuating mechanism responsive to seat back positioning is illustrated and comprises a striker flange 50 welded or otherwise suitably fastened to the underside of the auxiliary floor-forming panel 16 inwardly of the outwardly curved surface 37. A rod member 52 having a transversely bent hook portion 53 is rotatably supported by a bracket 54 secured to a side panel of the vehicle body or other suitable support and is adapted for latching engagement with the striker flange 50 in the floor-forming position. A torsion spring 56 biases the hook portion 53 toward an unlatched position. The hook portion 53 is formed integrally with the control rod 52 and is rotatably supported by bushings 60, 62 which are secured to the bracket 54. The control rod extends rearwardly beneath the auxiliary floor line to a position adjacent the top of the seat back in the auxiliary floor-forming position. As shown in FIGURES 11 and 12, the rearward end of the control rod 52 is upwardly bent to form an actuator arm 64 that is engageable with a portion of the seat back 10 and is provided with a spring member 66 to bias the actuator arm in an upwardly extending position shown in phantom in FIGURE 12. The rod is rotatably supported within bushings 68, 70 attached to a bracket 72 that is fixed to a side panel of the vehicle body or other suitable support. As hereinbefore described, a key cylinder 38, locking plate 40 and striker flange 42 are provided to lock the seat back in the auxiliary floor-forming position.

Referring now to FIGURES 13 and 14, an alternative latch-actuating arrangement is shown in the form of a reciprocable control rod 74 that is connected to a hook arm 76 by a bell crank 78. A bracket 80 is fixed to the floor-forming panel 20 and rotatably supports the hook arm 76 and the bell crank 78. A spring 82 is provided to bias the hook arm to an unlatched position. The other end of the control rod is shown in FIGURES 15 and 16 to be connected to an actuator arm 84 rotatably mounted on a bracket 86 fixed to a vehicle body side panel. A spring clip 83 connects the control rod 74 and the actuator arm, and spring member 82 biases the actuator arm upwardly and outwardly into the path of the seat back 10 during its rotative movement from an upright position to the auxiliary floor-forming position as shown in phantom in FIGURE 16. As before, a key cylinder 38, locking plate 40 and striker flange 42 are provided to lock the seat in the auxiliary floor-forming position.

In operation of the latching means shown in FIGURES 1-8, the seat back 10 is rotated downwardly about the pivotal connection 14 to cause the auxiliary floor-forming panel 16 to slide downwardly on the roller member 30 until the outwardly curved portion 32 engages the roller member. The hook portion 36 of the plate 34 is thereby positioned behind the striker 28 of the roller pin 26 to prevent outward, upward movement of the auxiliary floor-forming panel 20 about the hinge 18 without movement of the seat back 10. In the floor-forming position the key cylinder 38 may be actuated to rotate the locking plate 40 into locking engagement with the striker flange 42 to prevent upward movement of the seat back and consequently the auxiliary floor-forming panel 16. In the modifications shown in FIGURES 9-16, the latching mechanism associated with the floor-forming panel 20 is actuated to a latching position through a control rod 52 or 74 that is connected to an actuator arm 64 or 84 positioned in the downward rotative path of the seat back 10. As the seat back is lowered into the auxiliary floor-forming position, the actuator arm 64 or 84 is forced downwardly against the bias of the associated spring means to actuate the control rod 52 or 74 and rotate the hook arm 53 or 76 into latching engagement with the striker 50 against the unlatching bias of the associated spring member. In the auxiliary floor-forming position the key cylinder 38 may be actuated to rotate the locking plate 40 beneath the striker flange 42 and secure the seat in the auxiliary floor-forming position.

It is to be understood that the phraseology and terminology employed herein is for the purpose of description and not of limitation. Accordingly, the invention is not intended to be limited in its application to the details of construction and arrangement of the parts illustrated in the accompanying drawings, except insofar as limited by the prior art and as defined by the appended claims.

We claim:

1. In foldable vehicle seat structure having auxiliary floor-forming portions associated therewith, a vehicle seat movable in a pivotal path from a normal occupant accommodating position to a collapsed auxiliary floor-forming position, an auxiliary floor-forming plate pivotally associated with said vehicle seat and movable from a stored position when said seat is in seat-forming position to an auxiliary floor-forming plate position when said seat is in an auxiliary floor-forming position, latching means responsive to the position of said seat to latch said auxiliary floor-forming plate, and means to lock said seat in said floor-forming position, said latching means comprising a spring biased abutment member extending upwardly into the path of said seat, a latching member pivotally secured adjacent the horizontal position of said auxiliary floor-forming portions, a striker member fixed to said floor-forming portions and adapted to engage said latching member in the horizontal position of said floor-forming portions, control means linking said abutment member and said latching member for engaging movement thereof relative to said striker member as said abutment member is moved downwardly by movement of said seat to the auxiliary floor-forming position.

2. In foldable vehicle seat structure having auxiliary floor-forming portions associated therewith, a vehicle seat movable in a pivotal path from a normal occupant accommodating position to a collapsed auxiliary floor-forming position, an auxiliary floor-forming plate pivotally associated with said vehicle seat and movable from a stored position when said seat is in seat-forming position to an auxiliary floor-forming plate position when said seat is in an auxiliary floor-forming position, latching means responsive to the position of said seat to latch said auxiliary floor-forming plate, and means to lock said seat in said floor-forming position, said latching means comprising an abutment member extending upwardly in the path of movement of said seat from the normal upright position to the auxiliary floor-forming position, said abutment member having a longitudinal center section extending longitudinally of said vehicle beneath the auxiliary floor line and rotatably supported relative thereto, the other end of said member being upwardly bent to form a latching arm, a spring means biasing said abutment member upwardly and biasing said latching arm to a disengaged position, a striker formed on said auxiliary seat portion and being positioned for locking engagement with said latching arm, and said latching arm and said abutment member being positioned relative to said rotatable central portion to cause auxiliary floor locking engagement of said striker and said latching arm as said abutment member is moved downwardly by said seat.

3. The apparatus as defined in claim 1 having a locking plate rotatably fixed to said seat, a key cylinder associated with said locking plate, a striker flange fixedly secured adjacent the locking plate in the auxiliary floor-forming position of said seat, and key means to rotate said locking plate into locking engagement with said striker flange.

4. The apparatus as defined in claim 2 and having a locking plate rotatably fixed to said seat, a key cylinder associated with said locking plate, a striker flange fixedly secured adjacent the locking plate in the auxiliary floor-forming position of said seat, and key means to rotate said locking plate into locking engagement with said striker flange.

5. Vehicle seat apparatus including a pivotally mounted seat back pivotally movable from an upright seat-forming position to a horizontal auxiliary floor-forming position, and comprising; an auxiliary floor-forming plate pivotally secured to said seat back and being rotatably movable relative thereto during pivotal movement of said seat back to be correspondingly positioned in an upright position or an auxiliary floor-forming position, latch mechanism associated with said auxiliary floor-forming plate, a latch mechanism actuator positioned in the pivotal path of said seat back and operative in the auxiliary floor-forming position of said seat back, and latch control means linking said latch mechanism and said actuator to lock said auxiliary floor-forming plate in the auxiliary floor-forming position.

6. Apparatus as defined in claim 5 and having latch mechanism associated with said seat back and actuating means to lock said seat back in said auxiliary floor-forming position.

7. Vehicle seat apparatus including a pivotally mounted seat back pivotally movable from an upright seat-forming position to a horizontal auxiliary floor-forming position, and comprising, an auxiliary floor-forming plate pivotally secured to said seat back and being rotatably movable relative thereto during pivotal movement of said seat back to be correspondingly positioned in said upright position or said auxiliary floor-forming position, a striker associated with said auxiliary floor-forming plate, a latch control rod rotatably supported beneath the floor-forming surfaces of said auxiliary floor-forming plate and said seat back in said auxiliary floor-forming position, a latch arm formed on one end of said control rod adjacent said striker and being engageable therewith, an actuator arm formed on the other end of said control rod and extending upwardly into the path of movement of said seat back from said upright position to said auxiliary seat-forming position, spring means controllably associated with said control rod to bias said actuator arm to an extended position and to bias said latch arm to an unlatched position, and said control arm being rotated by auxiliary seat-forming movement of said seat back against said actuator arm to engage said latch arm with said striker.

References Cited in the file of this patent
UNITED STATES PATENTS

| | | |
|---|---|---|
| 1,067,008 | Draper | July 8, 1913 |
| 1,806,692 | Lemon | May 26, 1931 |
| 2,602,691 | Doty | July 8, 1952 |
| 2,677,574 | Golubics | May 4, 1954 |
| 2,926,950 | Hooverson | Mar. 1, 1960 |
| 2,926,951 | Koplin | Mar. 1, 1960 |
| 2,927,818 | Ferrara | Mar. 8, 1960 |